(12) United States Patent
Long et al.

(10) Patent No.: US 12,194,836 B2
(45) Date of Patent: Jan. 14, 2025

(54) CARBON CANISTER WITH DIRECT CONNECT FUEL TANK ISOLATION VALVE

(71) Applicant: Stant USA Corp., Connersville, IN (US)

(72) Inventors: John C. Long, Connersville, IN (US); George J. Mitri, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 12 days.

(21) Appl. No.: 17/968,429

(22) Filed: Oct. 18, 2022

(65) Prior Publication Data

US 2023/0117323 A1 Apr. 20, 2023

Related U.S. Application Data

(60) Provisional application No. 63/257,086, filed on Oct. 18, 2021.

(51) Int. Cl.
*B60K 15/03* (2006.01)
*B60K 15/035* (2006.01)
(Continued)

(52) U.S. Cl.
CPC .. *B60K 15/03519* (2013.01); *B60K 15/03504* (2013.01); *B60K 2015/03447* (2013.01); *B60K 2015/03514* (2013.01); *B60K 2015/03557* (2013.01); *F02M 25/0836* (2013.01); *F16K 31/0655* (2013.01)

(58) Field of Classification Search
CPC ............. F02M 25/089; F02M 25/0836; F02M 25/0854; F02M 2025/0845; B60K 15/03519; B60K 15/03504; B60K 2015/03514; B60K 2015/03585; B60K 2015/03296; B60K 2015/03493; B60K 2015/03523-03557; B60K 2015/03302; B60K 2015/03447; B01D 2253/102; B01D 2259/4566; B01D 2259/4516; Y10S 137/907; F16K 13/00-10; F16K 31/14-145; F16K 31/0655; F16K 11/24
USPC ................. 123/520, 516, 518, 519; 137/199, 137/493-493.9, 614.16, 907, 507, 354, 137/351, 899, 343, 613; 285/90, 404
See application file for complete search history.

(56) References Cited

U.S. PATENT DOCUMENTS 3,628,517 A  12/1971 Soberski
3,683,597 A * 8/1972 Beveridge .......... F02M 25/0836
                                                         55/513

(Continued)

FOREIGN PATENT DOCUMENTS

CN      205654455       10/2016
CN      206071758 U     4/2017
(Continued)

OTHER PUBLICATIONS

Translation KR100648080 (Year: 2006).*
(Continued)

*Primary Examiner* — Craig J Price
(74) *Attorney, Agent, or Firm* — Barnes & Thornburg LLP

(57) ABSTRACT

A fuel tank vent valve includes a venting apparatus for regulating discharge of fuel vapor from a fuel tank and admission of outside air into a fuel tank. The vent valve is used to regulate pressure in a fuel tank.

20 Claims, 7 Drawing Sheets

(51) Int. Cl.
*F02M 25/08* (2006.01)
*F16K 31/06* (2006.01)

(56) References Cited

U.S. PATENT DOCUMENTS

| | | | |
|---|---|---|---|
| 3,741,232 A | 6/1973 | Soberski | |
| 4,137,882 A * | 2/1979 | Thornburgh | F02M 25/0854 |
| | | | 123/520 |
| 4,149,504 A * | 4/1979 | Walters | F02M 25/0854 |
| | | | 137/907 |
| 4,193,383 A | 3/1980 | Rogers | |
| 4,203,401 A | 5/1980 | Kingsley et al. | |
| 4,280,466 A * | 7/1981 | Walters | F02M 25/0854 |
| | | | 123/520 |
| 4,308,842 A * | 1/1982 | Watanabe | F02M 25/089 |
| | | | 123/519 |
| 4,541,396 A * | 9/1985 | Sato | F02M 25/0836 |
| | | | 123/518 |
| 5,148,720 A * | 9/1992 | Swenson, Sr. | F16H 61/143 |
| | | | 411/389 |
| 5,501,198 A * | 3/1996 | Koyama | F02M 25/0809 |
| | | | 123/198 D |
| 5,623,911 A * | 4/1997 | Kiyomiya | F02M 25/0854 |
| | | | 123/520 |
| 5,632,251 A * | 5/1997 | Ishikawa | F02M 25/0854 |
| | | | 123/519 |
| 5,809,978 A | 9/1998 | Krimmer et al. | |
| 5,878,729 A * | 3/1999 | Covert | F02M 25/0836 |
| | | | 123/520 |
| 5,996,559 A * | 12/1999 | Busato | F02M 35/10144 |
| | | | 123/184.21 |
| 6,073,617 A * | 6/2000 | Busato | F02M 35/10144 |
| | | | 123/184.21 |
| 6,085,615 A * | 7/2000 | Kirkendall | F16H 61/0009 |
| | | | 74/606 R |
| 6,170,516 B1 * | 1/2001 | Sakata | F02M 25/0836 |
| | | | 251/129.15 |
| 6,230,585 B1 * | 5/2001 | Bator | F16H 61/0009 |
| | | | 248/300 |
| 6,328,021 B1 | 12/2001 | Perry et al. | |
| 6,431,156 B1 * | 8/2002 | Murakami | F02M 25/08 |
| | | | 123/520 |
| 6,450,153 B1 | 9/2002 | Perry | |
| 6,453,942 B1 | 9/2002 | Perry | |
| 6,460,566 B1 | 10/2002 | Perry et al. | |
| 6,470,861 B1 | 10/2002 | Perry | |
| 6,470,908 B1 | 10/2002 | Perry | |
| 6,474,313 B1 | 11/2002 | Perry et al. | |
| 6,474,314 B1 | 11/2002 | Perry et al. | |
| 6,478,045 B1 | 11/2002 | Perry | |
| 6,484,555 B1 | 11/2002 | Perry et al. | |
| 6,502,560 B1 * | 1/2003 | Perry | F02M 25/0809 |
| | | | 137/493 |
| 6,505,514 B1 | 1/2003 | Perry | |
| 6,514,326 B1 | 2/2003 | Hara et al. | |
| 6,585,230 B2 | 7/2003 | Perry | |
| 6,623,012 B1 | 9/2003 | Perry et al. | |
| 6,701,901 B2 | 3/2004 | Perry et al. | |
| 6,739,573 B1 | 5/2004 | Balsdon | |
| 6,840,232 B2 | 1/2005 | Perry | |
| 6,863,095 B2 | 3/2005 | Osaki et al. | |
| 6,878,194 B2 * | 4/2005 | Hoffman | B01D 53/261 |
| | | | 96/147 |
| 6,910,500 B2 | 6/2005 | Perry et al. | |
| 6,983,641 B1 | 1/2006 | Perry et al. | |
| 7,025,084 B2 | 4/2006 | Perry et al. | |
| 7,040,301 B2 | 5/2006 | Perry et al. | |
| 7,100,305 B2 * | 9/2006 | Hoffman | B60T 17/004 |
| | | | 96/147 |
| 7,225,798 B2 | 6/2007 | Wang et al. | |
| 7,249,595 B2 | 7/2007 | Mills et al. | |
| 7,472,694 B2 | 1/2009 | King | |
| 7,493,894 B2 * | 2/2009 | Davis | B60K 15/03504 |
| | | | 220/749 |
| 7,527,044 B2 * | 5/2009 | Dunkle | F02M 25/0854 |
| | | | 123/519 |
| 7,530,348 B2 * | 5/2009 | Wang | F02M 25/0836 |
| | | | 123/518 |
| 8,578,914 B2 | 11/2013 | Lee et al. | |
| 9,031,721 B2 | 5/2015 | Fukui et al. | |
| 9,145,051 B2 | 9/2015 | Dudar et al. | |
| 9,163,592 B2 | 10/2015 | Kim et al. | |
| 9,216,646 B2 | 12/2015 | Yang et al. | |
| 9,217,397 B2 | 12/2015 | Peters et al. | |
| 9,243,592 B2 | 1/2016 | Dudar et al. | |
| 9,322,342 B2 | 4/2016 | Dudar et al. | |
| 9,359,977 B2 * | 6/2016 | Brock | F02M 25/0872 |
| 9,376,969 B2 | 6/2016 | Yang et al. | |
| 9,415,680 B2 | 8/2016 | Dudar et al. | |
| 9,429,114 B2 | 8/2016 | Dudar et al. | |
| 9,599,071 B2 | 3/2017 | Dudar | |
| 9,669,825 B1 | 6/2017 | Dudar | |
| 9,683,525 B2 | 6/2017 | Koller et al. | |
| 9,746,013 B2 * | 8/2017 | Talley | F16M 13/02 |
| 9,834,205 B1 | 12/2017 | Dudar | |
| 10,024,281 B2 * | 7/2018 | Lohr | F02M 35/10255 |
| 10,167,823 B2 | 1/2019 | Dudar | |
| 10,183,660 B2 | 1/2019 | Dudar | |
| 10,458,366 B2 | 10/2019 | Brock et al. | |
| 10,544,874 B2 * | 1/2020 | Hentschel | F16K 27/029 |
| 10,549,628 B2 | 2/2020 | Hagen | |
| 10,611,625 B2 | 4/2020 | Dudar | |
| 10,717,488 B2 * | 7/2020 | Tani | B62J 35/00 |
| 10,850,609 B2 | 12/2020 | Vulkan et al. | |
| 10,907,583 B2 | 2/2021 | Honda et al. | |
| 11,215,147 B2 * | 1/2022 | Brock | F02M 25/0854 |
| 2006/0207576 A1 | 9/2006 | Mills et al. | |
| 2008/0223343 A1 | 9/2008 | Ammermann | |
| 2009/0101119 A1 | 4/2009 | Ammermann | |
| 2009/0255516 A1 * | 10/2009 | Matsumoto | F16K 27/029 |
| | | | 123/520 |
| 2011/0203947 A1 | 8/2011 | Ogawa | |
| 2014/0150661 A1 | 6/2014 | Himmel | |
| 2014/0345709 A1 | 11/2014 | Jefford et al. | |
| 2016/0186700 A1 | 6/2016 | Nishiura | |
| 2016/0245238 A1 | 8/2016 | Ueda | |
| 2018/0119650 A1 | 5/2018 | Brock et al. | |
| 2019/0084410 A1 | 3/2019 | Bhandari et al. | |
| 2019/0249624 A1 | 8/2019 | Seki | |
| 2019/0368431 A1 | 12/2019 | Dudar | |
| 2021/0254583 A1 | 8/2021 | Brock et al. | |
| 2023/0008621 A1 * | 1/2023 | Long | F02M 25/0836 |
| 2023/0213105 A1 * | 7/2023 | Bhandari | F16K 31/10 |
| | | | 137/487.5 |

FOREIGN PATENT DOCUMENTS

| | | |
|---|---|---|
| CN | 206206017 U | 5/2017 |
| CN | 206338141 U | 7/2017 |
| CN | 206436819 U | 8/2017 |
| CN | 104582992 B | 11/2017 |
| CN | 108035826 A | 5/2018 |
| CN | 110385981 A | 10/2019 |
| CN | 209539471 U | 10/2019 |
| CN | 111439113 A | 7/2020 |
| CN | 211422789 | 9/2020 |
| CN | 111927959 A | 11/2020 |
| CN | 109458276 B | 12/2020 |
| CN | 212672413 U | 3/2021 |
| CN | 213838792 U | 7/2021 |
| JP | 2001020810 A | 1/2001 |
| JP | 2006258101 | 9/2006 |
| KR | 10-0648080 B1 | 12/2006 |
| KR | 1020210057508 | 5/2021 |

OTHER PUBLICATIONS

PCT International Search Report and Written Opinion completed by the ISA/KR on Feb. 13, 2023 and issued in connection with PCT/US2022/046995.

(56) References Cited

OTHER PUBLICATIONS

PCT International Search Report and Written Opinion completed by the ISA/KR on Feb. 13, 2023 and issued in connection with PCT/US2022/046999.

PCT International Search Report and Written Opinion completed by the ISA/KR on Feb. 13, 2023 and issued in connection with PCT/US2022/046996.

* cited by examiner

CARBON CANISTER WITH DIRECT CONNECT FUEL TANK ISOLATION VALVE

PRIORITY CLAIMS

This application claims priority under 35 U.S.C. § 119 (e) to U.S. Provisional Application Ser. No. 63/257,086, filed Oct. 18, 2021, which is expressly incorporated by reference herein.

BACKGROUND

The present disclosure relates to fuel tank vent valves, and particularly to venting apparatus for regulating discharge of fuel vapor from a fuel tank and admission of outside air into the fuel tank. More particularly, the present disclosure relates to a fuel tank pressure regulator including a fuel tank vent valve.

Vehicle fuel systems include valves associated with a fuel tank and configured to vent pressurized or displaced fuel vapor from the vapor space in the fuel tank to a fuel-vapor recovery canister located outside of the fuel tank. The canister is designed to capture and store hydrocarbons entrained in fuel vapors that are displaced and generated in the fuel tank during a typical vehicle refueling operation or that are otherwise vented from the fuel tank.

The vapor recovery canister is also coupled to a vehicle engine and to a purge vacuum source. Typically, vacuum is applied to the vapor recovery canister by the purge vacuum source whenever the vehicle engine is running in an effort to suck hydrocarbons captured and stored in the canister into the engine for combustion.

SUMMARY

A tank venting system in accordance with the present disclosure includes a canister housing shaped to include a media storage body defining a storage cavity that contains a carbon bed, a fuel tank isolation valve assembly having a fuel tank isolation valve to regulate flow of fuel vapor between a fuel tank and the storage cavity of the canister housing, and valve assembly coupling means for coupling the fuel tank isolation valve assembly to the canister housing. The canister housing, or fuel-vapor recovery canister, is in fluid communication between the fuel tank and an engine in the vehicle to absorb hydrocarbons in the fuel vapor flowing into and out of the fuel tank. The flow of fuel vapor is controlled to maintain the pressure of fuel vapor in the fuel tank at a certain pressure level or within a certain pressure range.

In the illustrative embodiments, the fuel tank isolation valve assembly includes a valve housing and the fuel tank isolation valve. The valve housing is formed to define a fuel fuel-tank vapor port adapted to be coupled in fluid communication with the fuel tank and a vapor-transfer passageway in fluid communication with the fuel fuel-tank vapor port. The fuel tank isolation valve is located in the vapor-transfer passageway to regulate flow of fuel vapor between the fuel tank and the storage cavity.

In the illustrative embodiment, the valve assembly coupling means is provided between the valve housing and the storage body closure. The valve assembly coupling means is provided between the valve housing and the storage body closure to couple the fuel tank isolation valve assembly to the canister housing so that the vapor-transfer passageway of the valve housing is in direct fluid communication with the storage cavity of the canister housing.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figures 1, 2:
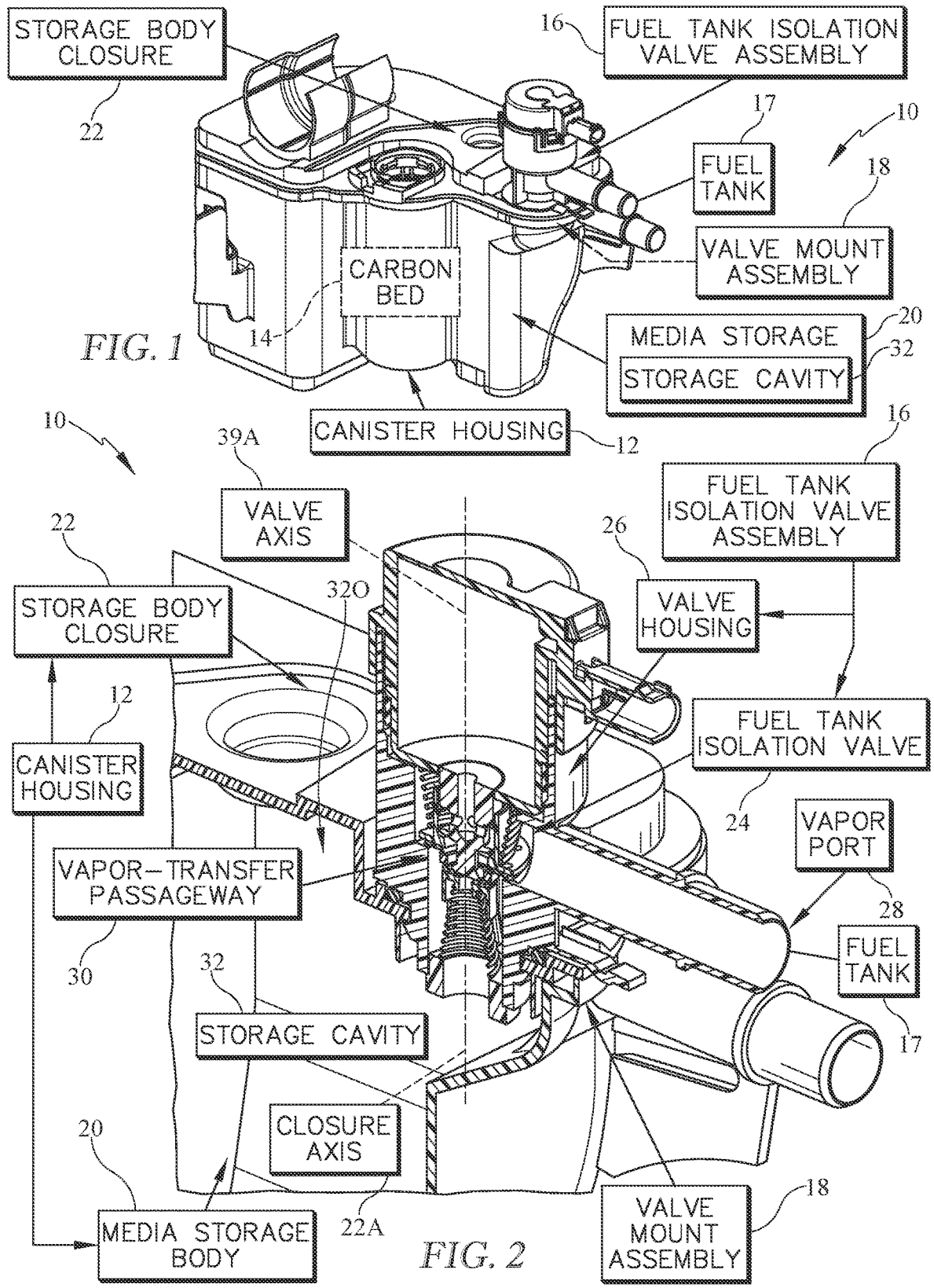
FIG. 1 is a diagrammatic perspective view of a tank venting system in accordance with the present disclosure comprising a canister housing shaped to include a media storage body defining a storage cavity that contains a carbon bed and a storage body closure coupled to the storage body to close a top opening to the storage cavity, a fuel tank isolation valve assembly having a fuel tank isolation valve to regulate flow of fuel vapor between a fuel tank and the storage cavity of the canister housing, and valve assembly coupling means for coupling the fuel tank isolation valve assembly directly to the canister housing.
FIG. 2 is cross-section view of the tank venting system of FIG. 1 showing the fuel tank isolation valve assembly further includes a valve housing formed to define a fuel-tank vapor port adapted to be coupled in fluid communication with the fuel tank and a vapor-transfer passageway in fluid communication with the fuel-tank vapor port, the fuel tank isolation valve is located in the vapor-transfer passageway to regulate flow of fuel vapor between the fuel tank and the storage cavity, and further showing the valve assembly coupling means is provided between the valve housing and the storage body closure to couple the fuel tank isolation valve assembly to the canister housing so that the vapor-transfer passageway of the valve housing is in direct fluid communication with the storage cavity of the canister housing.

A fuel tank venting system 10 comprises a canister housing 12 having a storage cavity 32 containing a carbon bed 14, a fuel tank isolation valve assembly 16, and valve assembly coupling means 18 for coupling the fuel tank isolation valve assembly 16 directly to the canister housing 12 as shown in FIGS. 1-5. Canister housing 12 is shaped to include a media storage body 20 defining storage cavity 32 that contains the carbon bed 14 and a storage body closure 22 coupled to storage body 20 to close a top opening 32O to storage cavity 32. Fuel tank isolation valve assembly 16 includes a fuel tank isolation valve 24 to regulate flow of fuel vapor between a fuel tank 17 and storage cavity 32 of canister housing 12.

Fuel tank isolation valve assembly 16 further includes a valve housing 26 as shown in FIG. 2-7. Valve housing 26 is formed to define a fuel-tank vapor port 28 and a vapor-transfer passageway 30. Fuel-tank vapor port 28 is adapted to be coupled in fluid communication with fuel tank 17. Vapor-transfer passageway 30 is in fluid communication with fuel-tank vapor port 28. In the illustrative embodiment, fuel tank isolation valve 24 is located in vapor-transfer passageway 30 to regulate flow of fuel vapor between fuel tank 17 and storage cavity 32.

Figure 7A:
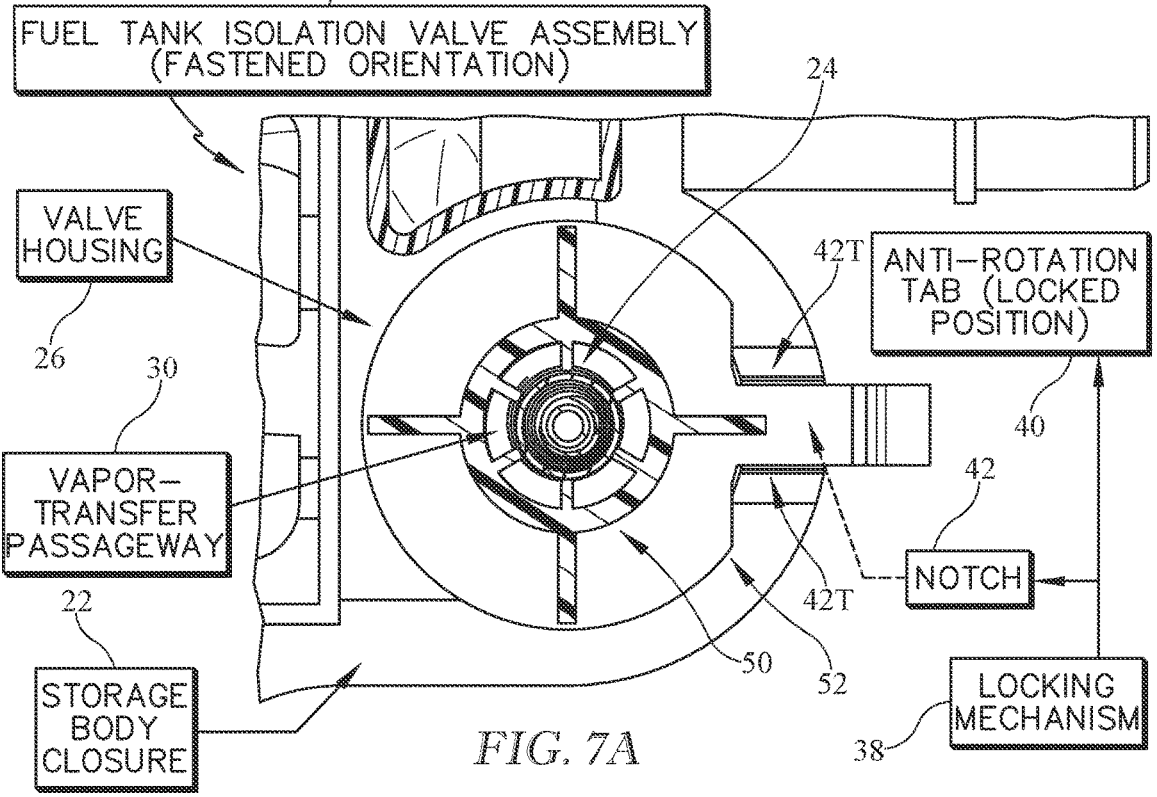
FIG. 7A is a sectional top view of the tank venting system of FIG. 7 showing the fuel tank isolation valve assembly in the fastened orientation so that the anti-rotation tab is located in the notch in the storage body closure to block rotation of the fuel tank isolation valve assembly about the central vertical axis.
Figure 7:
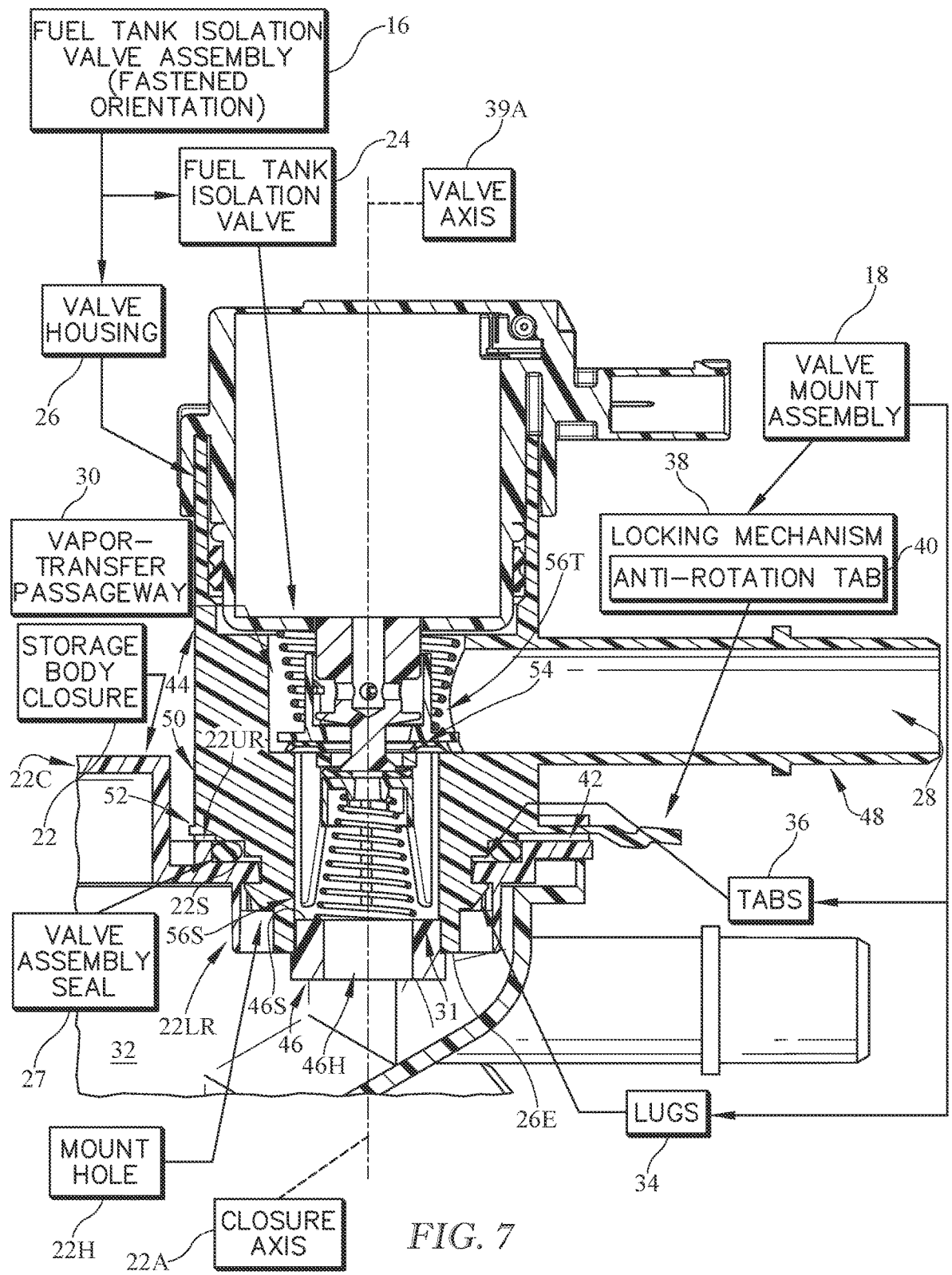
FIG. 7 is a view similar to FIG. 6 showing the fuel tank isolation valve assembly has been rotated about the central vertical axis from the fastening orientation to the fastened orientation to cause each of the lugs included in the plurality of lugs on the valve housing to engage with the corresponding tabs included in the plurality of tabs on the storage body closure to block axial movement of the valve housing relative to the canister housing.

Valve assembly coupling means 18 is provided between valve housing 26 and storage body closure 22 to couple fuel tank isolation valve assembly 16 to canister housing 12 so that vapor-transfer passageway 30 of valve housing 26 is in direct fluid communication with storage cavity 32 of canister housing 12 as shown in FIGS. 2 and 7. In this way, no hosing or pipes need to be used to connect fuel tank isolation valve 24 to canister housing 12. Rather, vapor-transfer passageway 30 of valve housing 26 opens directly into storage cavity 32 of canister housing 12 so as to interconnect storage cavity 32 and vapor port 28.

Vapor-transfer passageway 30 is arranged to interconnect storage cavity 32 and vapor port 28 to enable transfer fuel vapor flowing from fuel tank 17 through vapor port 28 to storage cavity 32 of media storage body 20 and to enable transfer of hydrocarbon-laden vapor flowing from storage cavity 32 of media storage body 20 through vapor port 28 to fuel tank 17. Fuel tank isolation valve 24 is located in vapor-transfer passageway 30 so as to regulate flow of fuel vapor in vapor-transfer passageway 30 between vapor port 28 and storage cavity 32 of media storage body 20. Fuel tank isolation valve 24 is used onboard a vehicle (not shown) including an engine and a purge vacuum source (not shown) coupled to the engine and the media storage body 20.

Valve assembly coupling means 18 also fixes valve housing 26 of fuel tank isolation valve assembly 16 directly to storage body closure 22 of canister housing 12 with valve housing 26 located in a predetermined position relative to storage body closure 22 of canister housing 12 as shown in FIGS. 2 and 7. In the predetermined position, valve housing 26 extends into a mount hole 22H formed in storage body closure 22 to cause vapor-transfer passageway 30 of valve housing 26 to be in fluid communication with storage cavity 32 of canister housing 12 and to cause a valve axis 39A of fuel tank isolation valve assembly 16 to overlap with a closure axis 22A of storage body closure 22.

Figure 5:
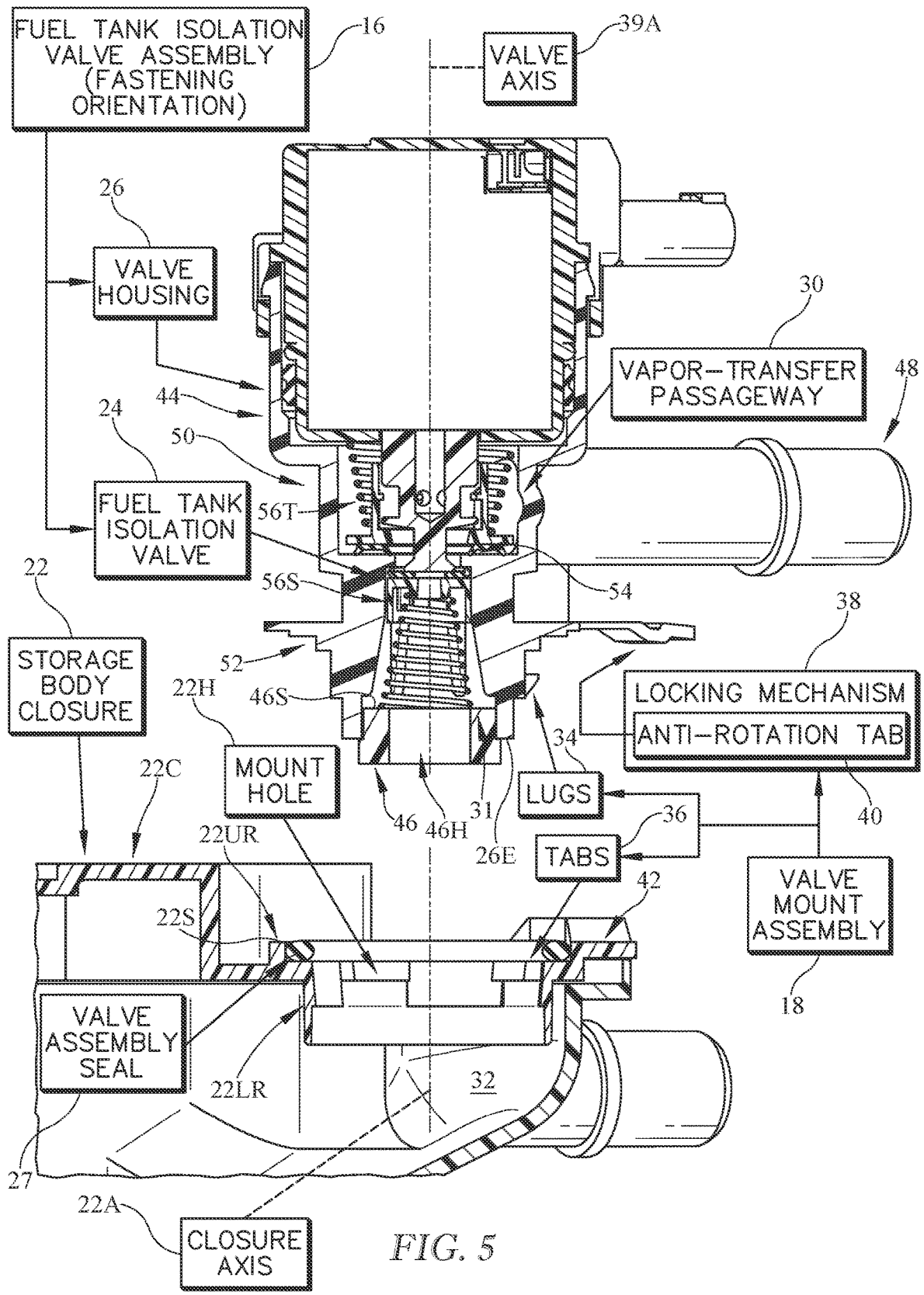
FIG. 5 is a sectional side elevation view of the tank venting system of FIG. 1 before the fuel tank isolation valve assembly is coupled to the storage body closure by the valve assembly coupling means showing the fuel tank isolation valve assembly is in a fastening orientation in which each lug included in the plurality of lugs is aligned with the corresponding groove defined by the plurality of tabs on the storage body closure so that an inner end of the valve housing may be inserted into a mount hole formed in the storage body closure.
Figure 6:
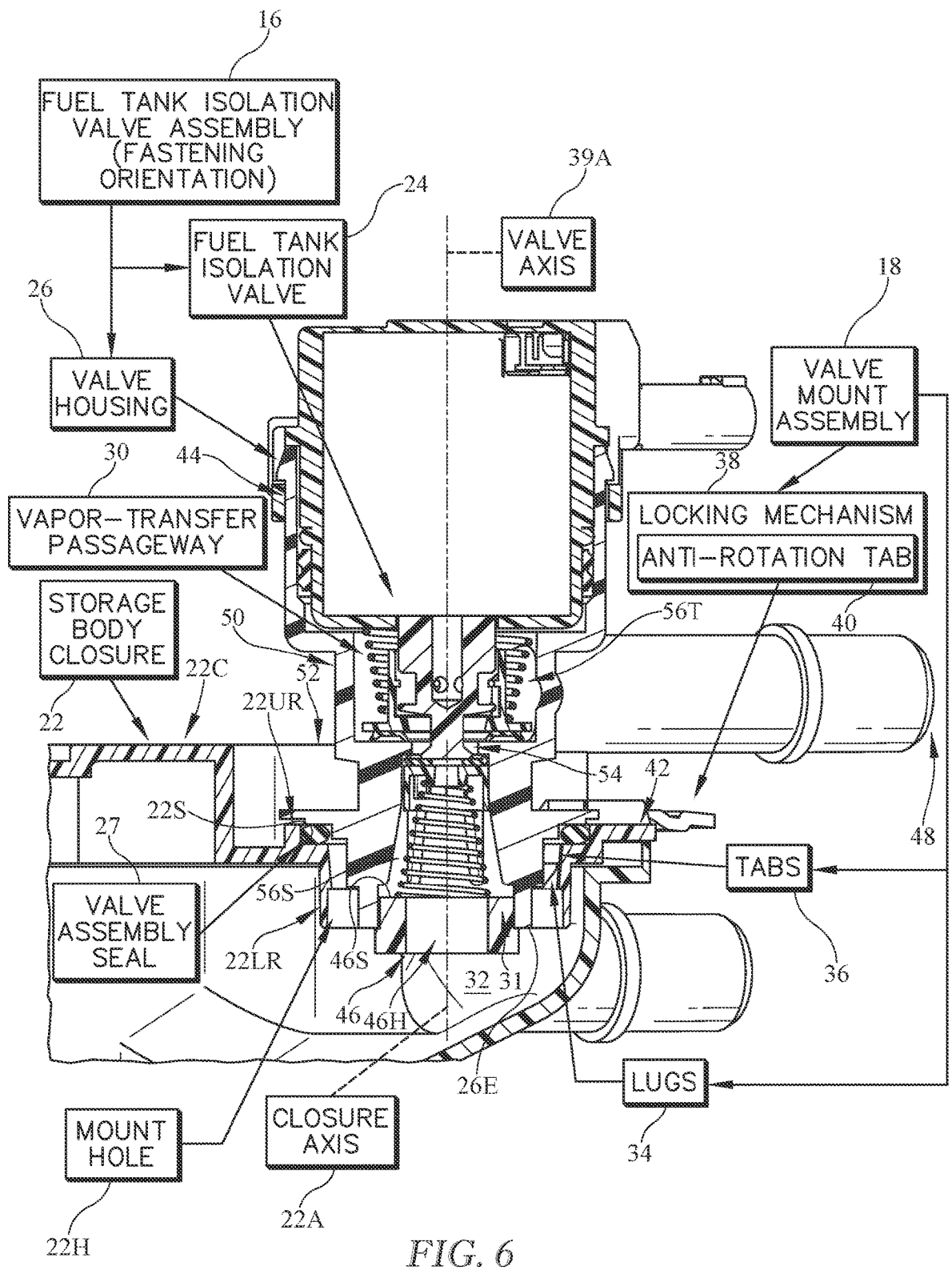
FIG. 6 is a view similar to FIG. 5 showing the fuel tank isolation valve assembly has been moved along a central vertical axis of the fuel tank isolation valve assembly to insert the inner end of the valve housing into the mount hole of the storage body closure so that the plurality of lugs are located axially inward of the plurality of tabs.
Figure 6A:
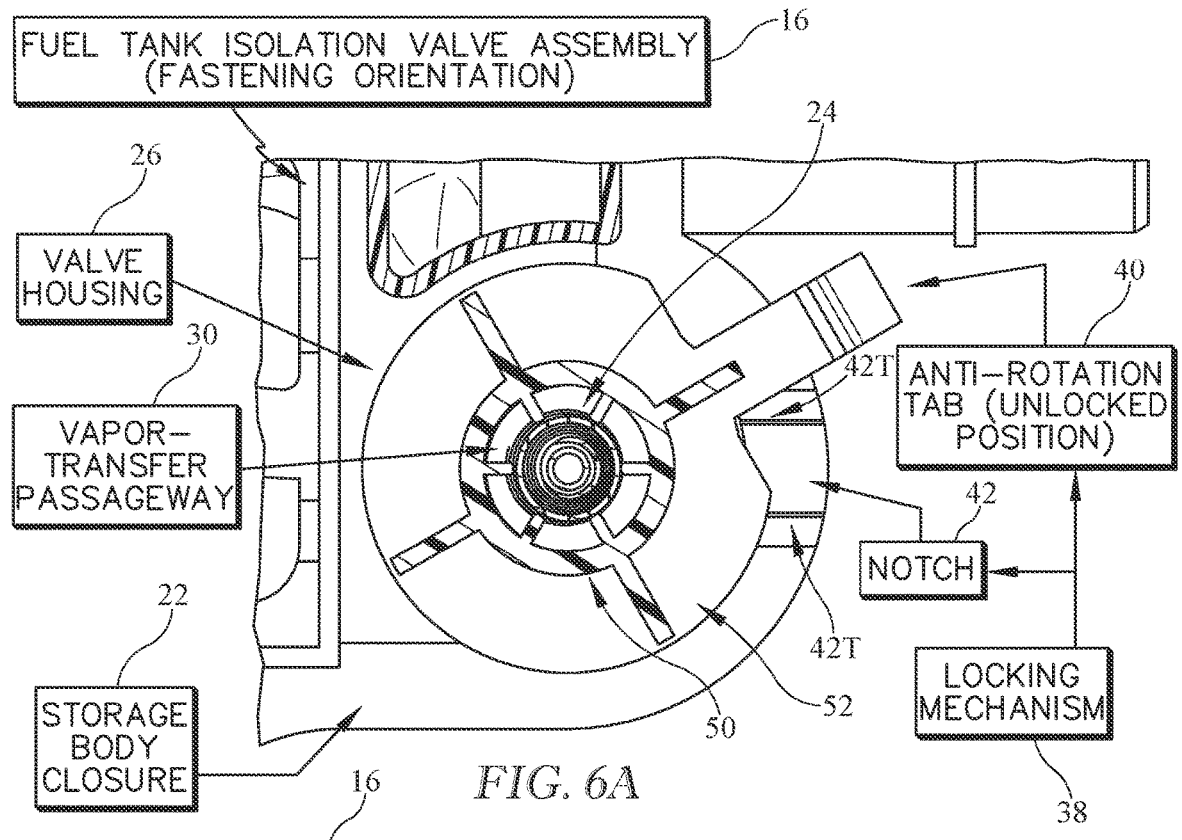
FIG. 6A is a sectional top view of the tank venting system of FIG. 6 showing the fuel tank isolation valve assembly is in the fastening orientation so that the anti-rotation tab is spaced apart from the notch formed in the storage body closure.

In this way, valve housing 26 is blocked from tilting and rotating about valve axis 39A relative to storage body closure 22, thereby reducing the wear on a valve assembly seal 27 between valve housing 26 and storage body closure 22. Valve assembly seal 27 is a seal ring 27 located between storage body closure 22 and valve housing 26 to seal between storage body closure 22 and valve housing 26 once valve housing 26 is coupled to storage body closure 22 as shown in FIGS. 5-7. Valve assembly coupling means 18 allows fuel tank isolation valve assembly 16 to be directly coupled to storage body closure 22 of canister housing 12, thereby removing any pipes or hoses between fuel tank isolation valve assembly 16 and canister housing 12 to eliminate leak paths between fuel tank 17 and the engine. As valve housing 26 is directly coupled to canister housing 12, valve assembly seal 27 is located directly between valve housing 26 and storage body closure 22 to seal therebetween.

Therefore, maintaining proper engagement of valve housing 26 and storage body closure 22 with valve assembly seal 27 may be important to reduce leaks therebetween. Tilting or rotating of valve housing 26 may reduce the effectiveness of seal ring 27 as tilting may cause seal ring 27 to disengage valve housing 26/storage body closure 22 and/or may damage seal ring 27 over time. Fixing valve housing 26 in the predetermined position maintains valve housing 26 in proper engagement with seal ring 27.

Canister housing 12 is a carbon canister in the illustrative embodiment and includes carbon bed 14 in storage cavity 32 to remove hydrocarbons in the fuel vapor flowing into and out of media storage body 20. Fuel tank isolation valve assembly 16 controls the fuel vapor flowing into and out of media storage body 20, while the valve assembly coupling means 18 couples the fuel tank isolation valve assembly 16 directly to storage body closure 22 of storage body 20 so that fuel vapor flowing to and from fuel tank 17 is able to flow directly between storage cavity 32 of media storage body 20 and vapor-transfer passageway 30 without any additional hoses or pipes.

In vehicles with a normal internal combustion engine, the fuel vapor from the fuel tank is vented directly to the surrounding atmosphere. Directly venting the fuel vapor to the surrounding atmosphere may be harmful to people and/or the environment.

However, in partially hybrid electric vehicles (PHEV), the internal combustion engine included in the vehicle operates intermittently and therefore the fuel tank system is frequently closed off from the atmosphere when not in use (i.e. the engine is not being used). Closing the system off from the atmosphere may reduce the harmful emissions to the surrounding environment, but may create a need to control/regulate the fuel vapor in the system.

The fuel vapor in the fuel tank may therefore be at a higher pressure or a lower vacuum pressure than normal engines, which may make opening fuel system lines when ready for use a challenge. Further, if the increased pressure in the fuel tank is not released, the fuel tank may become damaged or even explode.

Fuel tank systems may include a fuel tank isolation valve to control the flow fuel vapor and air between the fuel tank and a canister used to store the pressurized fuel vapor to release built up pressure in the fuel tank at different stages. The canister is configured to "clean" fuel vapor vented from the fuel tank during tank refueling. The canister may be in fluid communication with the engine, the fuel tank, and the atmosphere, which provides several leak paths for the fuel vapor.

In the illustrative embodiment, valve assembly coupling means 18, also referred to as valve mount assembly 18, couples fuel tank isolation valve assembly 16 directly to storage body closure 22 of canister housing 12, thereby removing any pipes or hoses between fuel tank isolation valve assembly 16 and canister housing 12 to eliminate leak paths between fuel tank 17 and engine 19. Fuel vapor from fuel tank 17 flows through vapor port 28, through vapor-transfer passageway 30, and directly into storage cavity 32. An opening 31 to vapor-transfer passageway 30 formed by valve housing 26 opens directly into storage cavity 32 to put vapor-transfer passageway 30 in direct fluid communication with storage cavity 32.

In the illustrative embodiment, valve assembly coupling means 18 is a cam connection in the illustrative embodiment. In other embodiments, valve assembly coupling means 18 may be any one of a snap connection, a push on connection, a fastener connection including at least one of screws, bolts, and molded studs with nuts, and a threaded connection.

Valve assembly coupling means 18 includes a plurality of lugs 34, a plurality of tabs 36, and locking mechanism 38 as shown in FIGS. 3-7. Plurality of lugs 34 extend radially outward from valve housing 26 relative to a central vertical axis 39A of fuel tank isolation valve assembly 16. Lugs 34 extend radially outward from valve housing 26 adjacent an inner end 26E of valve housing 26. Plurality of tabs 36 extend radially inward from storage body closure 22 relative to axis 39A. In the illustrative embodiment, storage body closure 22 includes a mount hole 22H that extends through storage body closure 22 and tabs 36 extend radially inward from storage body closure 22 in mount hole 22H to define a plurality of grooves 36G. Mount hole 22H receives inner end 26E of valve housing 26 in the illustrative embodiment.

Figure 4:
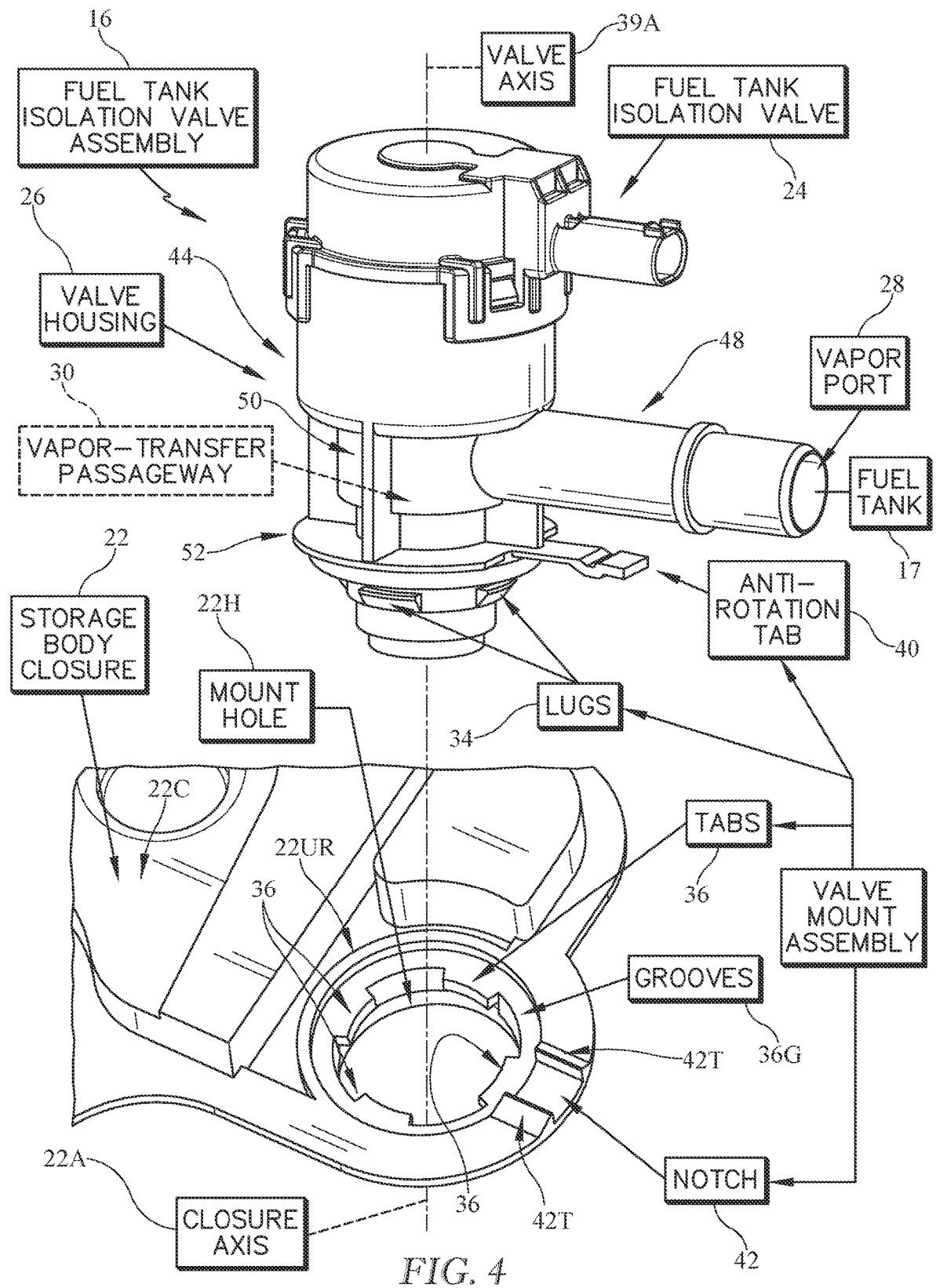
FIG. 4 is an exploded perspective view of the tank venting system of FIG. 1 showing the valve assembly coupling means is provided by a cam connection in the illustrative embodiment (in other embodiments the valve assembly coupling means may be any one of a snap connection, a push on connection, a fastener connection including at least one of screws, bolts, and molded studs with nuts, and a threaded connection), the cam connection including a plurality of lugs that extend radially outward from the valve housing relative to an axis of the fuel tank isolation valve assembly adjacent to the inner end of the valve housing, a plurality of tabs that extend radially inward from the storage body closure in the mount hole and are configured to engage the plurality of lugs formed on the valve housing when the valve housing is inserted into the mount hole and rotated about the axis, and anti-rotation means for blocking rotation of the valve housing about the central valve axis to maintain the fuel tank isolation valve assembly in the fastened orientation, and further showing the locking mechanism includes an anti-rotation tab that extends radially outward from the valve housing so as to engage a notch in the storage body closure after the valve housing is rotated to block rotation of the valve housing relative to the storage body closure once the lugs and tabs are engaged.

To engage valve assembly coupling means 18, inner end 26E of valve housing 26 is aligned with mount hole 22H so that lugs 34 match up with grooves 36G defined by tabs 36 as shown in FIG. 5. Then, inner end 26E of valve housing 26 is inserted into mount hole 22H so that lugs 34 pass through grooves 36G as shown in FIG. 6. To engage the cam connection 18, valve housing 26 is rotated about axis 39A until fuel tank isolation valve assembly 16 is in a fastened orientation, i.e. the predetermined position, as shown in FIGS. 2, 7, and 7A. In the fastened orientation, each tab 36 engages a corresponding lug 34 formed on valve housing 26 to couple fuel tank isolation valve assembly 16 to canister housing 12 as shown in FIGS. 4 and 7. Locking mechanism 38 provides anti-rotation means for blocking rotation of valve housing 26 about axis 39A to maintain fuel tank isolation valve assembly 16 in the fastened orientation after fuel tank isolation valve assembly 16 is rotated relative to storage body closure 22 of canister housing 12 about central vertical axis 39A.

Figure 3:
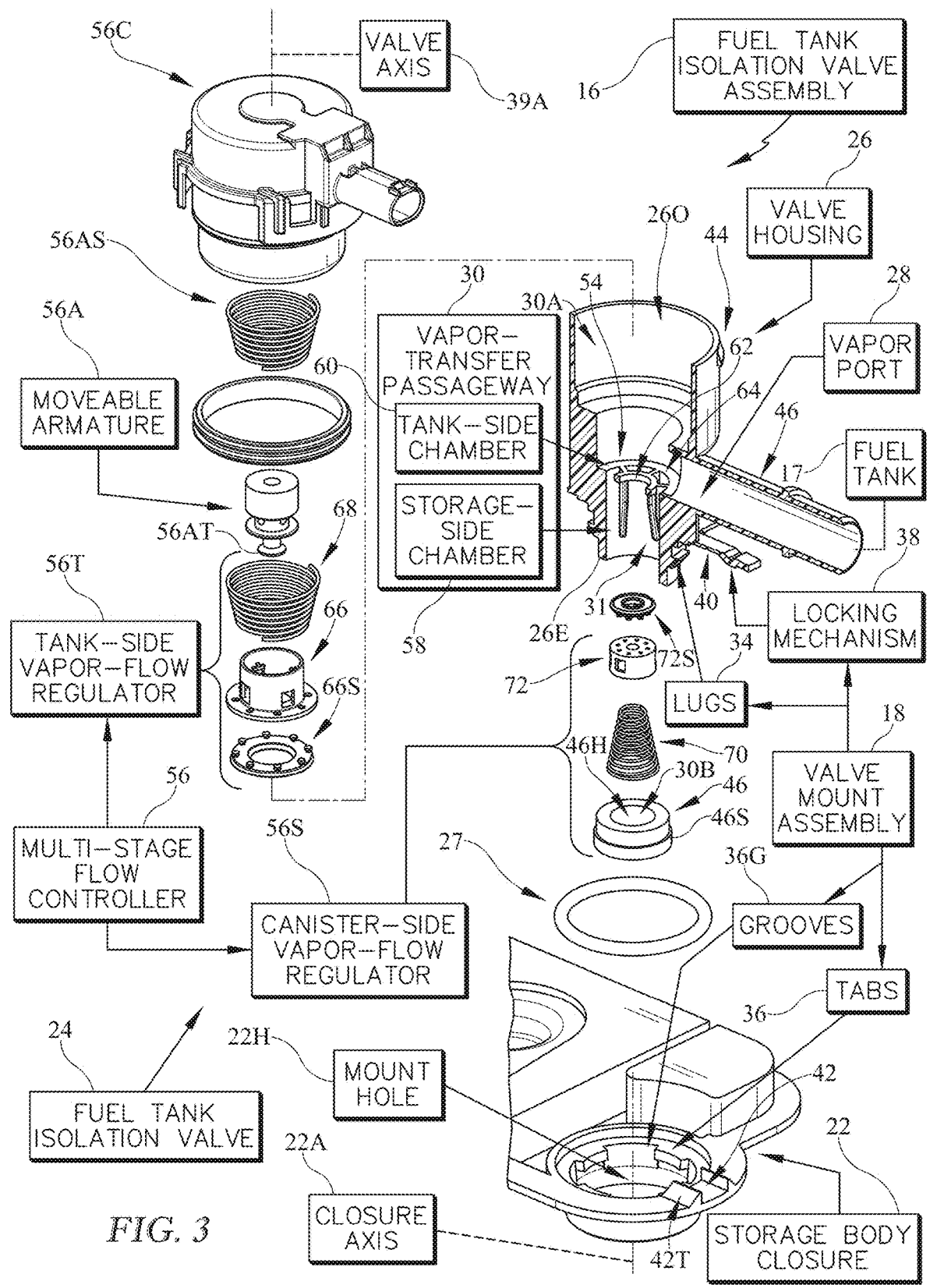
FIG. 3 is an exploded perspective view of the tank venting system of FIG. 1 showing the fuel tank isolation valve includes a perforated partition plate that divides the vapor-transfer passageway to form a tank-side chamber and a storage-side chamber, a tank-side vapor-flow regulator configured to be located in the tank-side chamber through a top opening in the valve housing, a spring-biased, solenoid-activated movable armature, and a storage-side vapor-flow regulator configured to be located in the storage-side chamber through a bottom opening in the valve housing that cooperates with the tank-side vapor-flow regulator and the movable armature to regulate the flow through the perforated partition plate.

Inner end 26E of valve housing 26 forms an opening 31 to vapor-transfer passageway 30 as shown in FIG. 3. Once fuel tank isolation valve assembly 16 is coupled to canister housing 12, opening 31 directly opens into storage cavity 32 thereby eliminating leak paths between fuel tank 17 and the engine. Fuel vapor from fuel tank 17 flows through fuel-tank vapor port 28, through vapor-transfer passageway 30, and directly into storage cavity 32. In the illustrative embodiment, an opening 31 to vapor-transfer passageway 30 opens directly into storage cavity 32 to put vapor-transfer passageway 30 in direct fluid communication with storage cavity 32.

Locking mechanism 38, also referred to as anti-rotation means 38, includes a locking or anti-rotation tab 40 and a notch 42 as shown in FIGS. 3-7A. Anti-rotation tab 40 is formed on valve housing 26, while notch 42 is formed in storage body closure 22. Anti-rotation tab 40 extends radially outward from valve housing 26 relative to axis 39A. When valve housing 26 of fuel tank isolation valve assembly 16 is rotated to the fastened orientation, anti-rotation tab 40 engages storage body closure 22 in the notch 42 thereby blocking rotation of valve housing 26 relative to storage body closure 22. To unlock valve housing 26, anti-rotation tab 40 is pivoted out of notch 42 to allow valve housing 26 to rotate about axis 39A.

Fuel tank venting system 10 includes canister housing 12, fuel tank isolation valve assembly 16, and valve mount assembly 18 as shown in FIGS. 2-5. Valve mount assembly 18 fixes valve housing 26 of fuel tank isolation valve assembly 16 directly to storage body closure 22 of canister housing 12 with valve housing 26 located in the predetermined position relative to storage body closure 22 of canister housing 12.

Canister housing 12 includes media storage body 20 and storage body closure 22 as shown in FIGS. 2-5. Media storage body 20 is formed to define storage cavity 32 containing carbon bed 14 configured to absorb hydrocarbons in fuel vapor from fuel tank 17 that flows into and out of storage cavity 32 of media storage body 20. Storage body closure 22 is selectively coupled to media storage body 20 to close top opening 32O to storage cavity 32.

Storage body closure 22 is formed to include a cover panel 22C, an upper rim 22UR, and a lower rim 22LR as shown in FIGS. 4 and 5. Cover panel 22C is selectively coupled to media storage body 20 to close top opening 32O to storage cavity 32. Upper rim 22UR extends axially outward away from cover panel 22C to form an annular surface 22S. Upper rim 22UR extends around mount hole 22H formed in the cover panel 22C. Lower rim 22LR extends axially inward away from cover panel 22C toward the storage cavity 32 of canister housing 12.

Mount hole 22H extends axially through cover panel 22C along closure axis 22A. Valve assembly seal 27, or seal ring 27, is located radially between valve housing 26 and upper rim 22UR of storage body closure 22 so that upper rim 22UR extends around seal ring 27 as shown in FIGS. 2, 6, and 7.

In the illustrative embodiment, tabs 42T extend axially from cover panel 22C as shown in FIGS. 3-4, 6A, and 7A. Tabs 42T extend axially from cover panel 22C to form notch 42. Tabs 42T engage anti-rotation tab 40 when fuel tank isolation valve assembly is in the fastened orientation as shown in FIG. 7A to block rotation of valve housing 26.

Fuel tank isolation valve assembly 16 includes valve housing 26, fuel tank isolation valve 24, and valve assembly seal 27 as shown in FIGS. 2-5. Fuel tank isolation valve 24 is arranged in valve housing 26. Valve assembly seal 27 is located in mount hole 22H of storage body closure 22 between valve housing 26 and storage body closure 22 to seal therebetween.

Valve housing 26 includes a valve housing body 44, a bottom mount member 46 independent of valve housing 26, and a vapor pipe 48 as shown in FIGS. 2-5. Valve housing body 44 is annular and defines vapor-transfer passageway 30. Bottom mount member 46 is coupled to valve housing body 44 to close bottom opening 31 of valve housing body 44 to provide a shoulder surface 46S to support components of fuel tank isolation valve 24 in vapor-transfer passageway 30. Vapor pipe 48 extends radially from valve housing body 44 relative to valve axis 39A.

In the illustrative embodiment, vapor-transfer passageway 30 extends along axis 39A of fuel tank isolation valve 24, while vapor pipe 48 extends at an angle relative to vapor-transfer passageway 30 as shown in FIGS. 4 and 5. The opening 31 of vapor-transfer passageway 30 into storage cavity 32 is aligned with axis 39A of fuel tank isolation valve 24 in the illustrative embodiment as shown in FIGS. 4 and 5.

Valve housing body 44 includes an annular outer wall 50 and an annular lip 52 as shown in FIGS. 2-6. Annular outer wall 50 defines the vapor-transfer passageway 30. Annular lip 52 extends circumferentially around and radially away from outer wall 50. In the illustrative embodiment, seal ring 27 is located between annular lip 52 of valve housing body 44 and canister housing 12. In the illustrative embodiment, lugs 34 extends radially outward from outer wall 50 and are spaced apart circumferentially from each other around outer wall 50 relative to valve axis 39A.

Bottom mount member 46 of valve housing 26 extends into mount hole 22H formed in storage body closure 22 so that vapor-transfer passageway 30 is in fluid communication the storage cavity 32 as shown in FIGS. 2, 6, and 7. Vapor pipe 48 is formed to define fuel-tank vapor port 28 adapted to be coupled in fluid communication with fuel tank 17. Fuel vapor from fuel tank 17 flows from fuel tank 17 through the vapor port 28 and vapor-transfer passageway 30 into storage cavity 32.

Fuel tank isolation valve 24 regulates fuel vapor flow through vapor-transfer passageway 30 to regulate pressure of fuel vapor within fuel tank 17 in accordance with predetermined pressure targets. Fuel tank isolation valve 24 is located in the first section 30A of the vapor-transfer passageway 30 in the illustrative embodiment.

Fuel tank isolation valve 24 includes a stationary perforated partition plate 54 mounted in vapor-transfer passageway 30 and a multi-stage flow controller 56 that is mounted for movement in vapor-transfer passageway 30 alongside and relative to perforated partition plate 54 as shown in FIGS. 3-5. Multi-stage flow controller 56 is configured to regulate flow of fuel vapor through separate central and orbital vents formed in perforated partition plate 54.

Perforated partition plate 54 is arranged to divide the first section 30A of vapor-transfer passageway 30 into a storage-side chamber 58 that communicates directly with storage cavity 32 of media storage body 20 through the second section 30B of vapor-transfer passageway 30 and an overlying tank-side chamber 60 that communicates with vapor port 28 as shown in FIGS. 4 and 5. Perforated partition plate 54 is formed to include a central vent aperture 62 to establish a first vent 62 and six orbital vent apertures 64 establishing a second vent 64 and surrounding the central vent aperture 62.

In the illustrative embodiment, perforated partition plate 54 is formed to include a round central vent aperture 62 centered on central vertical axis 39A and six arc-shaped orbital vent apertures 64 arranged to surround the round central vent aperture 62 and lie in radially spaced relation from central vertical axis 39A and circumferentially spaced-apart relation to one another. Perforated partition plate 54 is mounted in a stationary position in the vapor-transfer passageway 30 of valve housing 26.

In the illustrative embodiment, perforated partition plate 54 is arranged within the first section 30A of vapor-transfer passageway 30 defined by valve housing body 44. Bottom mount member 46 closes bottom opening 31 of valve housing 26 to define a portion of the storage-side chamber 58.

In the illustrative embodiment, valve housing body 44, vapor pipe 48, and perforated partition plate 54 are a monolithic component. Bottom mount member 46 is a separate piece that is coupled to valve housing body 44. In the illustrative embodiment, bottom mount member 46 is welded to valve housing body 44.

In the illustrative embodiment, fuel tank isolation valve 24 includes a solenoid 56 for use with multi-stage flow controller 56 as suggested in FIG. 1. The solenoid 56 may be used to control the multi-stage flow controller 56 during tank refueling activities. Solenoid 56 can be energized during different open modes of fuel tank isolation valve 24. In some embodiments, the multi-stage flow controller 56 of fuel tank isolation valve 24 may be mechanically activated using a suitable mechanical system using vacuum and pressure to control movement of the controller 56.

Perforated partition plate 54 of fuel tank isolation valve 24 is located in vapor-transfer passageway 30 formed in valve housing 26 as shown in FIGS. 4 and 5. Perforated partition plate 54 partitions vapor-transfer passageway 30 to define a tank-side chamber 60 above perforated partition plate 54 for conducting fuel vapor between the vapor port 28 and the center and orbital vents 62, 64 formed in perforated partition plate 54 and a storage-side chamber 58 below perforated partition plate 54 for conducting fuel vapor between the storage cavity 32 of media storage body 20 and the center and orbital vents 62, 64.

Multi-stage flow controller 56 is configured normally to engage perforated partition plate 54 to close the first and second vents 62, 64 formed in perforated partition plate 54 so as to block fuel vapor flow from vapor port 28 to storage cavity 32 through the vapor-transfer passageway 30 formed by valve housing 26 so that fuel tank 17 is normally isolated from fluid communication with storage cavity 32 of media storage body 20. However, multi-stage flow controller 56 is configured in to disengage from perforated partition plate 54 in several different ways so as to regulate flow of fuel vapor in vapor-transfer passageway 30 between fuel tank 17 and storage cavity 32 of media storage body 20 independently through central vent aperture 62 and also through several orbital vent apertures 64—during (1) early and later stages of fuel tank refueling activity, (2) development of unwanted vacuum conditions in fuel tank 17, and (3) development of unwanted over-pressure conditions in fuel tank 17.

Multi-stage flow controller 56 includes a tank-side vapor-flow regulator 56T and a storage-side vapor-flow regulator 56S as suggested in FIGS. 3 and 4. Tank-side vapor-flow regulator 56T is located above perforated partition plate 54 in tank-side chamber 60 that is formed in the vapor-transfer passageway 30 to communicate fuel vapor to and from fuel tank 17 via vapor port 28 coupled to fuel tank 17. Storage-side vapor-flow regulator 56S is located under perforated partition plate 54 in the storage-side chamber 58 that is formed in vapor-transfer passageway 30 to communicate fuel vapor to and from storage cavity 32 of media storage body 20. Each of tank-side and storage-side vapor-flow regulators 56T, 56S is aligned to move upwardly and downwardly relative to perforated partition plate 54 along a single vertical axis 39A that extends through the vapor-transfer passageway 30.

Multi-stage flow controller 56 also includes a spring-biased movable armature 56A that is operationally coupled to solenoid 56 and is arranged to extend into the vapor-transfer passageway 30 as shown in FIG. 5. Movable armature 56A moves relative to the stationary perforated partition plate 54 along the single vertical axis 39A that extends through the tank-side chamber 60, the central vent aperture 62 formed in perforated partition plate 54, and the storage-side chamber 58. Movable armature 56A cooperates with tank-side and storage-side vapor-flow regulators 56T, 56S when fuel tank isolation valve 24 is in a normal CLOSED mode to block flow of fuel vapor through the central and orbital vent apertures 62, 64 formed in perforated partition plate 54 so that fuel vapor cannot flow through the vapor-transfer passageway 30 between fuel tank 17 and storage cavity 32 of media storage body 20 and therefore fuel tank 17 normally is isolated from the media storage body 20.

Tank-side and storage-side vapor-flow regulators 56T, 56S are configured to move in the vapor-transfer passageway 30 relative to the stationary perforated partition plate 54 to close, partly open, and open vents 62, 64 formed in perforated partition plate 54 in response to changes in pressure of fuel vapor extant in the vapor-transfer passageway 30 and in fuel tank 17. Movable armature 56A is spring-biased normally to move toward storage-side vapor-flow regulator 56S and is operationally linked to solenoid 56 to move upwardly away from storage-side vapor-flow regulator 56S when solenoid 56 is energized. Movable armature 56A includes a distal tip 56AT that is arranged to extend into the vapor-transfer passageway 30 and move therein in response to a pushing force generated by an armature-biasing spring 56AS and actuation of solenoid 56 to assume various positions therein to cooperate with storage-side vapor-flow regulator 56S so as to close or partly open the central vent 62 formed in the perforated partition plate 54.

As mentioned above, fuel tank isolation valve 24 may be important to regulate the pressure of fuel vapor in the system of hybrid vehicles. Fuel tank isolation valve 24 is normally closed to block the flow of fuel vapor from tank 17 to media storage body 20 as shown in FIG. 5. Fuel tank isolation valve 24 has different open modes to regulate the flow of fuel vapor between fuel tank 17 and media storage body 20 based on different conditions of the system.

In the case of over-pressure conditions, fuel tank isolation valve 24 changes to one of the open modes to allow a release a large amount of pressure from fuel tank 17. Conversely, if there is vacuum conditions in fuel tank 17, fuel tank isolation valve 24 may change to another opened mode to alleviate unwanted vacuum conditions. Once the vehicle switches to using engine, fuel tank isolation valve 24 may change to one of open modes to allow the fuel vapor to flow from fuel tank 17 through media storage body 20 and to the engine to be burned with the fuel.

Releasing the built up pressure of the fuel vapor in the fuel tank may also be important during refueling of the fuel tank. When a person uses a fuel-dispersion pump nozzle to begin to discharge fuel into a filler neck leading to the fuel tank, fuel tank isolation valve 24 changes from closed mode to first opened mode to vent some displaced fuel vapor from fuel tank 17. After refueling begins and fuel is being discharged at a constant rate into fuel tank 17, fuel tank isolation valve 24 changes to second opened mode to vent more displaced fuel vapor.

As suggested in FIG. 3, fuel tank isolation valve 24 comprises a perforated partition plate 54, a multi-stage flow controller 56, and an armature-biasing solenoid 56. Multi-stage flow controller 56 includes a tank-side vapor-flow regulator 56T comprising a top hat-shaped spring cap 66 and a large-diameter compression (vacuum) spring 68; a movable armature 56A; and a storage-side vapor-flow regulator 56S comprising a narrow-diameter compression (pressure) spring 70 and a spring cap 72.

Bottom mount member 46 is located in bottom opening 31 of valve housing body 44 to retain multi-stage flow controller 56 in the first section 30A of vapor-transfer passageway 30. Bottom mount member 46 provides shoulder surface 46S engaged by other components of fuel tank isolation valve 24 to retain fuel tank isolation valve 24 in the vapor-transfer passageway 30.

Bottom mount member 46 is coupled to valve housing body 44 below compression spring 70 and spring cap 72 so that the spring 70 engages with the bottom mount member 46 to bias the spring cap 72 with the O-ring seal 72S into engagement with the underside of perforated partition plate 54. Bottom mount member 46 is shaped to define the second section 30B of vapor-transfer passageway 30, or opening 46H as shown in FIGS. 3 and 5-7, so as to allow pressurized fuel vapor to flow through bottom mount member 46.

As suggested in FIG. 3, movable armature 56A, spring 56AS, and tank-side vapor-flow regulator 56T included in fuel tank isolation valve 24 have been installed in the tank-side chamber 60 of the vapor-transfer passageway 30, while storage-side vapor-flow regulator 56S has been installed in the storage-side chamber 58. Movable armature 56A, spring 56AS, and tank-side vapor-flow regulator 56T are installed in tank-side chamber 60 of the vapor-transfer passageway 30 through an opening 260 in valve housing 26. Top-side vapor-transfer passageway closure 56C is then attached to valve housing 26 to close tank-side chamber 60 of vapor-transfer passageway 30.

The installation of movable armature 56A, spring 56AS, and tank-side vapor-flow regulator 56T causes a downwardly extending tip 56AT of movable armature 56A to extend along the single vertical axis 39A into the first vent 62 established by central vent aperture 62 and formed in perforated partition plate 54. The installation of movable armature 56A, spring 56AS, and tank-side vapor-flow regulator 56T also causes seal ring 66S of tank-side vapor-flow regulator 56T to engage an annular outer perimeter region of topside of perforated partition plate 54 to block fuel vapor from passing through the second vent 64 established by six orbital vent apertures 64 surrounding the central vent aperture 62. The round central vent aperture 62 and the six surrounding circumferentially spaced-apart arcuate orbital vent apertures 64 formed in perforated partition plate 54 of fuel tank isolation valve 24 are shown for example in FIG. 3.

Storage-side vapor-flow regulator 56S is installed through opening 31 of valve housing body 44. Spring cap 72 and spring 70 are inserted into the storage-side chamber 58 and bottom mount member 46 is then coupled to valve housing body 44 to close bottom opening 31. The installation of storage-side vapor-flow regulator 56S causes O-ring seal 72S of storage-side vapor-flow regulator 56S to engage the downwardly facing surface on distal tip 56AT of movable armature 56A and the downwardly facing surface on the annular inner perimeter region of underside of perforated partition plate 54 that surrounds the central vent aperture 62.

Tank venting system 10 includes valve assembly coupling means 18 for coupling fuel tank isolation valve assembly 16 directly to storage body closure 22 of canister housing 12 to cause vapor-transfer passageway 30 of valve housing 26 to be in fluid communication with storage cavity 32 of canister housing 12 when inner end 26E of fuel tank isolation valve assembly 16 is inserted into mount hole 22H formed in canister housing 12 and fuel tank isolation valve assembly 16 is rotated about central vertical axis 39A, or valve axis 39A, of fuel tank isolation valve assembly 16 so that fuel vapor flows directly between fuel tank 17 and storage cavity 32 of media storage body 20 when fuel tank isolation valve 24 is in one of a plurality of different open modes.

Valve assembly coupling means 18 includes plurality of lugs 34 and plurality of tabs 36 configured to engage plurality of lugs 34 when fuel tank isolation valve assembly 16 is rotated relative to canister housing 12 about central vertical axis 39A to the fastened orientation as shown in FIG. 10. This couples valve housing 26 of fuel tank isolation valve assembly 16 to canister housing 12 and blocks tilting of valve housing 26 about central vertical axis 39A relative to canister housing 12.

Each lug 34 extends radially outward from valve housing 26 relative to central vertical axis 39A of fuel tank isolation valve assembly 16 and each locking tab 36 extends radially inward from canister housing 12 relative to central vertical axis 39A as shown in FIGS. 3 and 4. Each tab 36 is formed on storage body closure 22 in the illustrative embodiment.

Valve assembly coupling means 18 further includes anti-rotation means 38, also referred to as locking mechanism 38, for blocking rotation of valve housing 26 about central valve axis 39A to maintain fuel tank isolation valve assembly 16 in the fastened orientation after fuel tank isolation valve assembly 16 is rotated relative to canister housing 12 about central vertical axis 39A.

Anti-rotation means 38 includes anti-rotation tab 40 and notch 42 as shown in FIGS. 3-7A. Anti-rotation tab 40 extends radially outward from valve housing 26 relative to central vertical axis 39A into notch 42 formed on canister housing 12 when valve housing 26 is in the fastened orientation so as to block rotation of valve housing 26 about central valve axis 39A.

Valve housing 26 includes annular valve housing body 44 that defines vapor-transfer passageway 30, vapor pipe 48, and annular lip 52 as shown in FIGS. 4-7A. Vapor pipe 48 extends radially from annular valve housing body 44 and forms vapor port 28. Annular lip 52 extends circumferentially around and radially away from annular valve housing body 44. In the illustrative embodiment, seal ring 27 is located between annular lip 52 of valve housing 26 and canister housing 12.

Storage body closure 22 includes cover panel 22C coupled to media storage body 20 to close top opening 32O of the storage cavity and upper rim 22UR that extends axially outward away from cover panel 22C to form an annular surface 22S as shown in FIGS. 5-7. Seal ring 27 is located radially between annular lip 52 of valve housing 26 and upper rim 22UR of storage body closure 22 so that upper rim 22UR extends around seal ring 27.

Valve assembly coupling means 18 includes plurality of lugs 34 and plurality of tabs 36 as shown in FIGS. 5-7. Each lug 34 extends radially outward from valve housing 26 relative to central vertical axis 39A of fuel tank isolation valve assembly 16 axially inward of annular lip 52 of the valve housing 26. Each tab 36 extends radially inward from storage body closure 22 relative to central vertical axis 39A.

Each lug 34 included in plurality of lugs 34 is aligned with one groove 36G when valve housing 26 is in the fastening orientation. Each tab 36 included in plurality of tabs 36 engages one lug 34 included in plurality of lugs 34 when valve housing 26 is in the fastened orientation. In the illustrative embodiment, valve housing 26 is in the predetermined position when fuel tank isolation valve assembly 16 is in the fastened orientation.

The invention claimed is:

1. A fuel tank venting system comprising a canister housing including a media storage body formed to define a storage cavity containing a carbon bed configured to absorb hydrocarbons in fuel vapor from a fuel tank that flows into and out of the storage cavity of the media storage body, a fuel tank isolation valve assembly including a valve housing formed to define a fuel-tank vapor port adapted to be coupled in fluid communication with the fuel tank and a vapor-transfer passageway arranged to interconnect the storage cavity in fluid communication with the fuel-tank vapor port to enable transfer of fuel vapor flowing from the fuel tank through the fuel-tank vapor port to the storage cavity of the media storage body and to enable transfer of hydrocarbon-laden vapor flowing from the storage cavity of the media storage body through the fuel-tank vapor port to the fuel tank and a fuel tank isolation valve located in the vapor-transfer passageway and configured to regulate the flow of fuel vapor between the fuel tank and the storage cavity, and valve assembly coupling means for coupling the fuel tank isolation valve assembly directly to the canister housing to cause the vapor-transfer passageway of the valve housing to be in fluid communication with the storage cavity of the canister housing so that fuel vapor flows directly between the fuel tank and the storage cavity of the media storage body, wherein the valve housing includes an annular valve housing body and a bottom mount member independent of the annular valve housing body and coupled to the annular valve housing body in a bottom opening of the valve housing body that opens directly into the storage cavity of the media storage body, wherein the valve housing body is shaped to define a first section of the vapor-transfer passageway and the bottom mount member is shaped to define a second section of the vapor-transfer passageway and a shoulder surface engaged by part of the fuel tank isolation valve to retain the fuel tank isolation valve in the first section of the vapor-transfer passageway.

2. The fuel tank venting system of claim 1, wherein the valve assembly coupling means includes a plurality of lugs that each extend radially outward from the valve housing relative to a central vertical axis of the fuel tank isolation valve assembly and a plurality of tabs that each extend radially inward from the canister housing relative to the central vertical axis and configured to engage the plurality of lugs when the fuel tank isolation valve assembly is rotated relative to the canister housing about the central vertical axis to a fastened orientation so as to couple the valve housing of the fuel tank isolation valve assembly to the canister housing and block tilting of the valve housing about the central vertical axis relative to the canister housing.

3. The fuel tank venting system of claim 2, wherein the canister housing further includes a storage body closure coupled to the media storage body to close a top opening to the storage cavity, and wherein the plurality of tabs are formed on the storage body closure.

4. The fuel tank venting system of claim 2, wherein the valve assembly coupling means further includes anti-rotation means for blocking rotation of the valve housing about the central valve axis to maintain the fuel tank isolation valve assembly in the fastened orientation after the fuel tank isolation valve assembly is rotated relative to the canister housing about the central vertical axis.

5. The tank venting system of claim 1, wherein the valve housing further includes a vapor pipe that extends radially from the annular valve housing body and forms the vapor port and an annular lip that extends circumferentially around and radially away from the annular valve housing body, and wherein the fuel tank isolation assembly further includes a seal ring located between the annular lip of the valve housing and the canister housing.

6. The tank venting system of claim 5, wherein the canister housing further includes a storage body closure coupled to the media storage body to close a top opening to the storage cavity, the storage body closure including a cover panel coupled to the media storage body to close the top opening of the storage cavity and a rim that extends axially outward away from the cover panel to form an annular surface, and wherein the seal ring is located radially between the annular lip of the valve housing and the rim of the storage body closure so that the rim extends around the seal ring.

7. The tank venting system of claim 1, wherein a valve axis of the fuel tank isolation valve assembly is axially aligned with and overlaps a closure axis of the storage body closure when the fuel tank isolation valve is in the fastened orientation.

8. The fuel tank venting system of claim 7, wherein the valve axis of the fuel tank isolation valve assembly is coaxial with the closure axis of the canister housing.

9. A fuel tank venting system comprising
a canister housing including a media storage body formed to define a storage cavity containing a carbon bed configured to absorb hydrocarbons in fuel vapor from a fuel tank that flows into and out of the storage cavity of the media storage body and a storage body closure selectively coupled to the media storage body to close a top opening to the storage cavity,
a fuel tank isolation valve assembly including a valve housing formed to define a fuel-tank vapor port adapted to be coupled in fluid communication with the fuel tank and a vapor-transfer passageway in fluid communication with the fuel-tank vapor port and a fuel tank isolation valve located in the vapor-transfer passageway and configured to regulate the flow of fuel vapor between the fuel tank and the storage cavity, and
valve assembly coupling means for coupling the fuel tank isolation valve assembly directly to the storage body closure of the canister housing to cause the vapor-transfer passageway of the valve housing to be in fluid communication with the storage cavity of the canister housing when an inner end of the fuel tank isolation valve assembly is inserted into a mount hole formed in the canister housing and the fuel tank isolation valve assembly is rotated about a central vertical axis of the fuel tank isolation valve assembly so that fuel vapor flows directly between the fuel tank and the storage cavity of the media storage body,
wherein valve housing includes an valve housing body and a bottom mount member coupled to the annular valve housing body in a bottom opening of the valve housing body, wherein the valve housing body is shaped to define a first section of the vapor-transfer passageway and the bottom mount member is shaped to define a second section of the vapor-transfer passageway and a shoulder surface engaged by part of the fuel tank isolation valve to retain the fuel tank isolation valve in the first section of the vapor-transfer passageway.

10. The fuel tank venting system of claim 9, wherein the valve assembly coupling means includes a plurality of lugs and a plurality of tabs configured to engage the plurality of lugs when the fuel tank isolation valve assembly is rotated relative to the canister housing about the central vertical axis to a fastened orientation so as to couple the valve housing of the fuel tank isolation valve assembly to the canister housing and block tilting of the valve housing about the central vertical axis relative to the canister housing.

11. The fuel tank venting system of claim 10, wherein the plurality of lugs each extend radially outward from the valve housing relative to the central vertical axis of the fuel tank isolation valve assembly and the plurality of locking tabs each extend radially inward from the canister housing relative to the central vertical axis.

12. The fuel tank venting system of claim 11, wherein the plurality of tabs are formed on the storage body closure.

13. The fuel tank venting system of claim 11, wherein the valve assembly coupling means further includes anti-rotation means for blocking rotation of the valve housing about the central valve axis to maintain the fuel tank isolation valve assembly in the fastened orientation after the fuel tank isolation valve assembly is rotated relative to the canister housing about the central vertical axis.

14. The fuel tank venting system of claim 9, wherein the valve assembly coupling means includes anti-rotation means for blocking rotation of the valve housing about the central valve axis to maintain the fuel tank isolation valve in a fastened orientation after the fuel tank isolation valve assembly is rotated relative to the canister housing about the central vertical axis.

15. The fuel tank venting system of claim 14, wherein the anti-rotation means includes an anti-rotation tab that extends radially outward from the valve housing relative to the central vertical axis into a notch formed on the canister housing when the valve housing is in the fastened orientation so as to block rotation of the valve housing about the central valve axis.

16. The tank venting system of claim 9, wherein the valve housing further includes a vapor pipe that extends radially from the annular valve housing body and forms the vapor port and an annular lip that extends circumferentially around and radially away from the annular valve housing body, and wherein the fuel tank isolation assembly further includes a seal ring located between the annular lip of the valve housing and the canister housing.

17. The tank venting system of claim 16, wherein the storage body closure including a cover panel coupled to the media storage body to close the top opening of the storage cavity and a rim that extends axially outward away from the cover panel to form an annular surface, and wherein the seal ring is located radially between the annular lip of the valve housing and the rim of the storage body closure so that the rim extends around the seal ring.

18. The tank venting system of claim 17, wherein the valve assembly coupling means includes a plurality of lugs that each extend radially outward from the valve housing relative to the central vertical axis of the fuel tank isolation valve assembly axially inward of the annular lip of the valve housing and a plurality of tabs that each extend radially inward from the storage body closure relative to the central vertical axis, and wherein each tab included in the plurality of tabs engages one lug included in the plurality of lugs when the valve housing is in a fastened orientation.

19. A fuel tank venting system comprising
a canister housing including a media storage body formed to define a storage cavity and a storage body closure selectively coupled to the media storage body to close a top opening to the storage cavity,
a fuel tank isolation valve assembly including a valve housing formed to define a fuel-tank vapor port adapted to be coupled in fluid communication with the fuel tank and a vapor-transfer passageway in fluid communication with the fuel-tank vapor port and a fuel tank isolation valve located in the vapor-transfer passageway and configured to regulate the flow of fuel vapor between the fuel tank and the storage cavity, and
a mount assembly configured to couple the fuel tank isolation valve assembly directly to the storage body closure of the canister housing to cause the vapor-transfer passageway of the valve housing to be in fluid communication with the storage cavity of the canister housing when an inner end of the fuel tank isolation valve assembly is inserted into a mount hole formed in the canister housing and the fuel tank isolation valve assembly is rotated about a central vertical axis of the fuel tank isolation valve assembly so that fuel vapor flows directly between the fuel tank and the storage cavity of the media storage body,
wherein the valve housing includes a valve housing body and a bottom mount member coupled to the valve housing body in a bottom opening of the valve housing body to provide a shoulder surface engaged by part of the fuel tank isolation valve to retain the fuel tank isolation valve in the vapor-transfer passageway of the valve housing.

20. The fuel tank venting system of claim 19, wherein the mount assembly includes a plurality of lugs and a plurality of tabs configured to engage the plurality of lugs when the fuel tank isolation valve assembly is rotated relative to the canister housing about the central vertical axis to a fastened orientation so as to couple the valve housing of the fuel tank isolation valve assembly to the canister housing and block tilting of valve housing relative to the canister housing.

* * * * *